Feb. 4, 1958 N. R. HASTINGS 2,821,852
PRECIPITATION GAUGE
Filed April 15, 1954 2 Sheets-Sheet 1

INVENTOR
Norman R. Hastings
BY
ATTORNEY

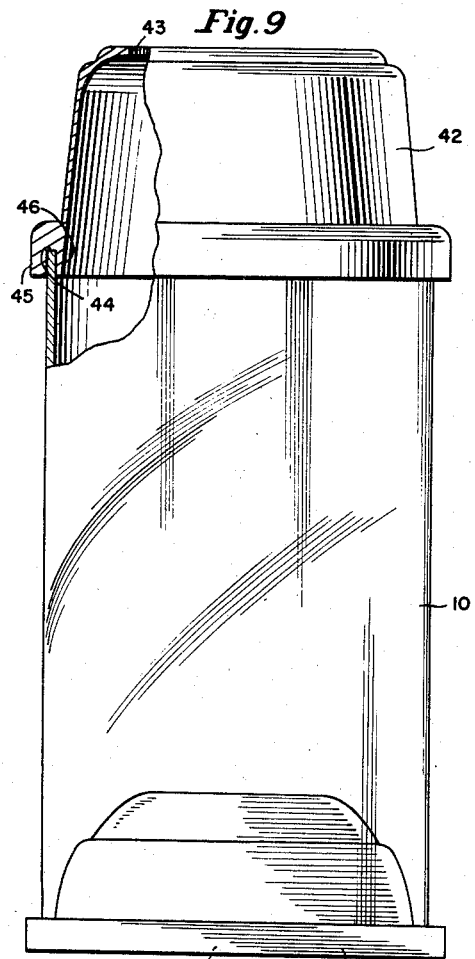
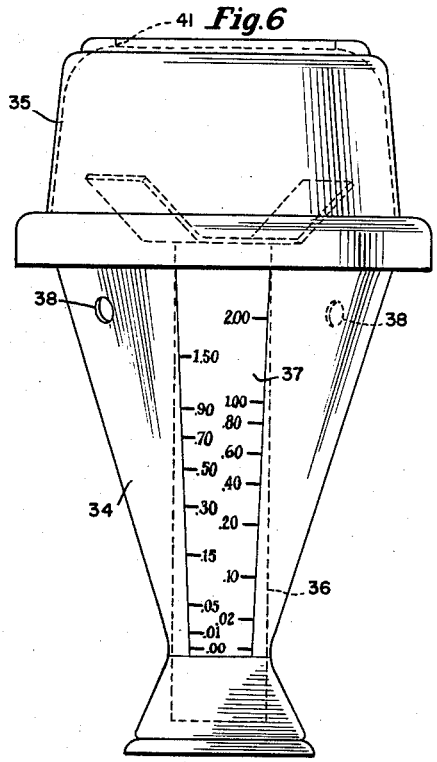
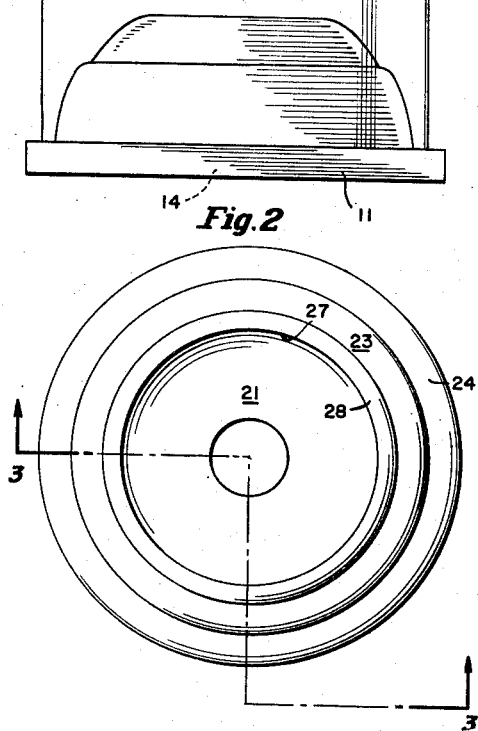
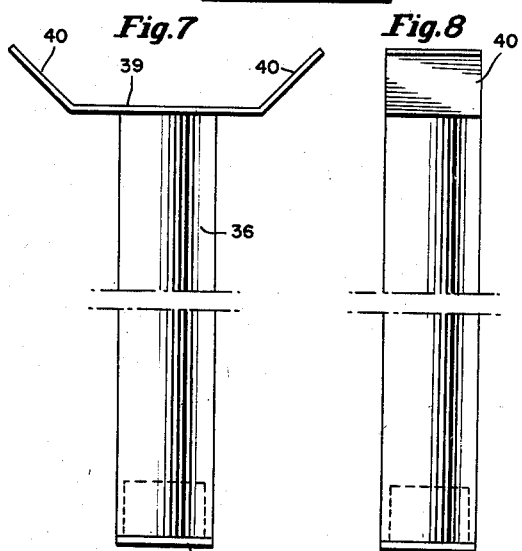

United States Patent Office 2,821,852
Patented Feb. 4, 1958

2,821,852

PRECIPITATION GAUGE

Norman R. Hastings, Huron, S. Dak., assignor to Walk Time, Inc., Huron, S. Dak., a corporation of South Dakota Application April 15, 1954, Serial No. 423,417

11 Claims. (Cl. 73—171)

The present invention relates to a precipitation gauge of general utility for use in weather stations or for other scientific work.

Heretofore various types of equipment have been used for measuring the precipitation whether such precipitation is in the form of rain or snow and the conventional equipment has been a container of cylindrical shape in which the precipitation would collect and reasonable accuracy was obtained when sufficient quantities of precipitation dropped. However, when very minute quantities of snow or rain fell, there was danger that such minute quantities would evaporate before measurements could be made and the measurement of a small quantity of liquid or solid precipitation was extremely difficult.

An object of the present invention is to overcome the difficulties of the prior art and provide for accurate measurement of precipitation whether rain or snow and regardless of the quantity of such precipitation.

Another object of the invention is to provide apparatus which will measure accurately minute quantities and also provide facilities for measuring large quantities of precipitation so that a single item of equipment may be used in weather stations located in widely divergent areas where precipitation may be extremely small such as .01 of an inch or where the precipitation may be large as for example, 5 inches of rainfall in an hour.

Figure 1:
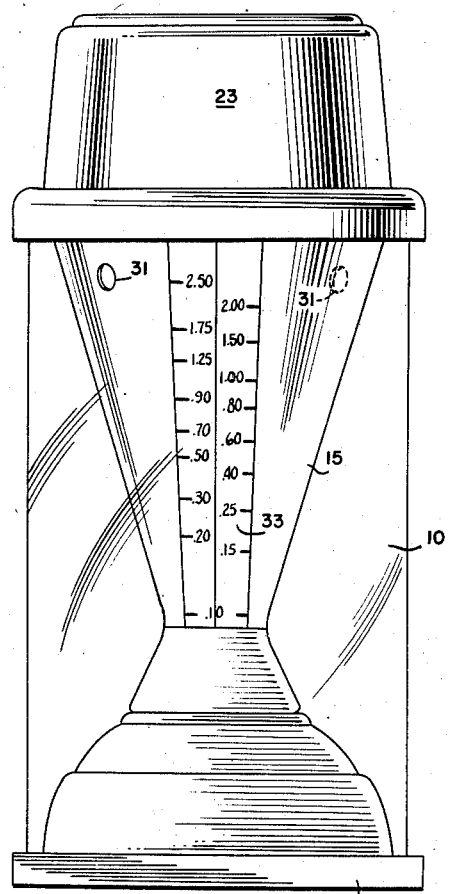
Figure 3:
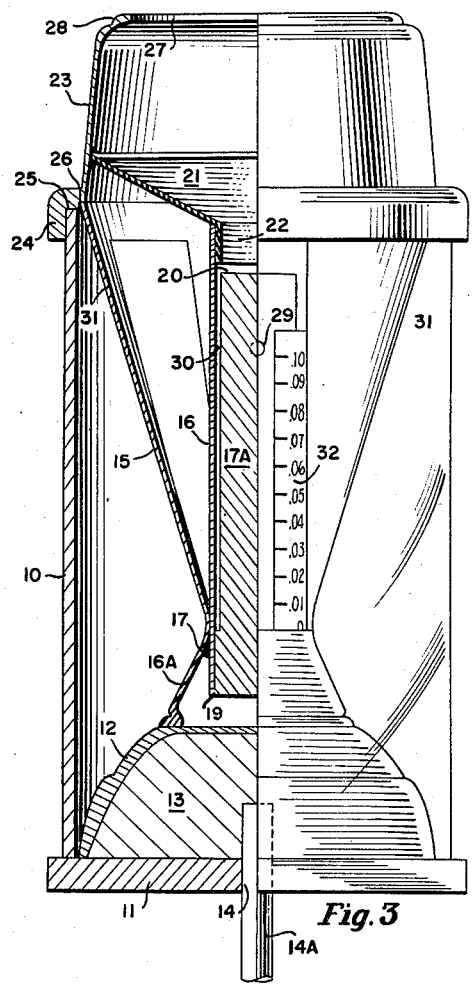
Figure 4:
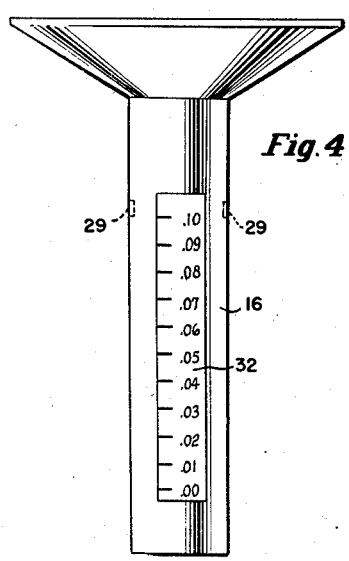
Figure 5:
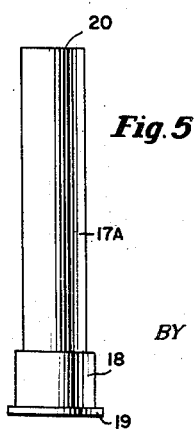

Other objects and advantages will become apparent as the description proceeds and particularly upon reference to the drawings, wherein:

Fig. 1 is an elevation of one form of the invention;

Fig. 2, a top plan view of Fig. 1;

Fig. 3, a sectional view of the form of the invention shown in Figs. 1 and 2 taken substantially on line 3—3 of Fig. 2;

Fig. 4, an elevation of the tubular member and funnel used in the form of the invention shown in Figs. 1 to 3 inclusive;

Fig. 5, a rod for use in the hollow tubular member of Fig. 4;

Fig. 6, an elevation of a modified form of gauge;

Fig. 7, an elevation of the rod and deflector used in the modified form of gauge shown in Fig. 6;

Fig. 8, an elevation taken transversely to Fig. 7 of the rod and deflector used in the modification of Fig. 6; and Fig. 9, an elevation of the device used as a snow gauge with parts broken away to show the construction of the hollow cap.

The present invention includes a generally cylindrical open top overflow receiving receptacle, an inverted hollow conical member is mounted within the cylindrical receptacle and an upstanding central member is mounted in said hollow conical member providing an annular liquid receiving space between said conical member and said upstanding central member flaring from the bottom upwardly. In one form of the invention the central upstanding member may be a hollow tubular member having a solid rod or closed hollow rod mounted within the hollow tube and providing an annular space for receiving small quantities of liquid from a funnel shaped member provided for guiding liquid into the hollow tubular member with such funnel shaped member overlying the hollow conical member. Preferably a frustum of a hollow cone is provided as a cap and the funnel member and the upper end of the conical member are fixed to the cap to prevent relative displacement and to prevent leakage between the periphery of the funnel and the inner periphery of the hollow cap. The cap is provided with an accurately formed opening in the top thereof. The tubular member is provided with a scale graduated in measurements of volume of the annular space between the hollow tubular member and the rod with an overflow opening provided in the tubular member at the height of a marking of the scale. A second scale is provided on the hollow conical member and such hollow conical member is provided at the same elevation as the top mark of the scale with an overflow opening providing communication with the overflow receiving receptacle. The quantity of liquid in the conical member may be accurately measured by the scale thereon and the overflow collected in the overflow receptacle may be subsequently measured by any suitable means such as the conical member. The frustum shaped cap overlies the top of the overflow receptacle preventing precipitation from dropping directly into such overflow receptacle.

In a modified form of the invention, the upstanding member within the hollow conical member is, in effect, a solid member having deflecting vanes in the upper end thereof with such deflecting vanes overlying the overflow opening in the conical member preventing precipitation from passing directly to the overflow receptacle.

A snow gauge is provided by using a frustum shaped cap directly on the cylindrical shaped overflow receptacle without the funnel, conical member, upstanding member or deflector. The amount of snow which drops into the receptacle corresponds to the amount falling on an area equal to the area of the opening in the top of the frustum shaped cap while permitting a relatively large quantity of snow to accumulate in the larger diameter overflow receptacle.

Referring more particularly to the drawings, a cylindrical overflow receptacle 10 made of glass, or plastic has a base 11 which may be of a similar material secured by a liquid-tight joint. On the upper surface of the base 11, a hollow circular element 12 is mounted and the space between such hollow element 12 and the base 11 is filled with plaster of Paris 13 or other material providing a heavy base for maintaining the overflow receptacle in stable upright position. The base is also provided with an aperture 14 centrally thereof for receiving a rod 14A on which the device may be mounted.

An inverted hollow conical or tubular member 15 is provided with a downwardly and outwardly flared portion 16A adapted to rest on the flattened upper portion of the member 12. Within the hollow conical member 15 a tubular member 16 is fixedly mounted by means of a waterproof adhesive or filling material 17 for maintaining the tubular member in fixed position with relation to the conical member 15. Within the tubular member a rod 17A which may be a hollow element closed at both ends is secured by means of an enlargement forming a stop 18 having a flange 19 for engagement with the lower end of the tubular member 16 thereby limiting the height to which the top 20 of such rod extends. Mounted in the upper end of the tube 16 is a funnel 21 having a stem 22 extending into the upper open end of the tubular member 16 and being maintained therein by any suitable means such as by friction between the stem 22 and the inner periphery of tube 16, a suitable material for the funnel and stem being rubber. A hollow frustum shaped cap 23 has a downwardly extending flange 24 which overlies the outer surface of the overflow receptacle 10, a shoulder 25 in the cap resting upon the top of the overflow receptacle and the cap being provided with an annular groove 26 spaced upwardly from the annular shoulder 25 and receiving the upper edge of the conical member 15, such conical member being secured in the groove 26 by a suitable adhesive or the like and the outer periphery of the funnel 21 being secured to the inner periphery of the cap 23 by a suitable adhesive or other material providing a watertight seal so that water collecting in the cap must pass down the stem 22 of the funnel and into the tubular member 16. The cap 23 is provided with an opening 27 formed by an inwardly and upwardly extending portion 28, the opening 27 being of a definite fixed area for facilitating calculations as to the quantity of precipitation. The opening 27 in the cap 23 is of less area than the open top of the inverted conical tubular member 15 whereby the effective measuring range of the precipitation gauge is materially increased over the use of the inverted conical member 15 without the cap.

The tubular member 16 is provided with overflow openings 29 on opposite surface portions thereof with the lower edge of each opening 29 being at the elevation of the 0.1 inch mark so that upon accumulation of liquid in the annular space 30 formed between the element 18 and the tubular member 16 the excess liquid above the precipitation mark of 0.1 will overflow through openings 29 into the inverted conical member 15 and such overflow will continue until member 15 is filled up to the 2.50 mark whereby the liquid will overflow through overflow openings 31 into the overflow receptacle 10 after the liquid precipitation reaches the height of 2.50 inches as measured in the apparatus.

In this modification of the invention small quantities of liquid precipitation up to .1 of an inch is measured by the scale 32 marked on or otherwise indicated on the tubular member 16 and after more than .1 of an inch of water has fallen, the remainder is measured on the scale 33 on the conical member 15. It will be noted that the lowermost graduation on the scale 33 is .1 of of an inch corresponding to .1 of an inch of water collected in the annular space 30, the water above that quantity registering on the scale 33 of the conical member 15.

Referring to Figs. 6 to 8, a modification of the invention including a different central upstanding element is shown to include a hollow conical member 34 having a frustum shaped cap 35 similar to cap 23 affixed thereto and a central upstanding element 36. Such upstanding element 36 may be a hollow tube closed at its lower end by a plug 36A and closed at its upper end by any suitable means such as the horizontal portion 39 of a deflector member, or the upstanding member may be a solid rod. Such upstanding element is fixed to the reduced neck portion of the hollow conical member by a sealing material forming a bottom to the annular space between the upstanding element 36 and the inner surface of the hollow conical member 34 so that the bottom of such space is on the .00 mark of a scale 37 on the conical member 34, the scale 37 reading from zero up to 2.00 inches of precipitation. The conical member is provided with overflow apertures 38 with the bottom edge of the overflow apertures substantially at the same elevation as as the 2.00 inch mark of the scale 37.

Affixed on the top of the upstanding member 36 is a deflector element including a horizontal portion 39 and outwardly and upwardly diverging wings 40 with the wings arranged to overly the diametrically opposite overflow apertures 38, 38 to prevent precipitation from passing directly from the opening 41 in the frustum shaped cap 35 through the overflow apertures 38, the cap 35 being secured to the conical member 34 and to the wing 40 of the deflector by suitable means such as a sealing material or the like.

In this form of the invention it will be apparent that the cap 35 and conical member 34 are adapted to be positioned within a hollow cylindrical overflow receptacle 10 and the overflow through the apertures 38 collects in the receptacle 10 and the total precipitation may be measured by adding the amount of precipitation collected in the overflow receptacle 10 to the 2.00 inches of precipitation collected in conical member 34. The precipitation collected in the overflow receptacle 10 is measured in the conical shaped member 34 after the conical shaped member 34 is drained whereby the same scale 37 is used for measuring the entire quantity of precipitation. With this form of the invention small amounts of precipitation cannot be as accurately measured as with the form of the invention shown in Figs. 1 to 5 but for many stations this is sufficiently accurate and the cost of production of the apparatus is materially less.

In the form of the invention shown in Fig. 9, the overflow receptacle 10 with the base 11 sealed thereon has a cap 42 of a shape similar to that of caps 23 and 35 with an opening 43 in the top thereof and a shoulder 44 in the lower portion for resting upon the upper edge of the receptacle 10 and a surrounding skirt 45 to prevent unintentional displacement. If desired, a downwardly extending flange 46 may be provided in the cap so that the precipitation falling through opening 43 cannot seep through between the shoulder 44 and the top of the receptacle 10. This form of the invention is particularly useful for measuring snowfall since the amount of snow will be accurately determined by the amount passing through the opening 43 at the top of the frustum cap 42.

It will be apparent that the precipitation gauge of the present invention may be used in freezing weather without damage to the gauge because of the camming action of the ice formed at the top of the liquid on the inclined surfaces formed by the inner surface of the conical member 15 and the inclined surface of the base 12 in the event that the precipitation overflows from the inverted conical member 15. The extremely small annular space between the tubular member and the rod contains such a small amount of liquid that freezing should produce no harmful effects. Consequently, the gauge is useful for measuring rain and snow even though the resulting liquid may freeze.

From the above description it will be apparent that applicant has provided a precipitation gauge suitable for small or large measurements of rainfall or snowfall with an accuracy substantially greater than that obtainable by previously known apparatus, and with a minimum of attention by the attendant.

Although the material of which the receptacle 10, conical members 15 and 34, and tubular member 16 are shown as being of transparent glass or plastic, it will be evident that other suitable material can be used.

It will be obvious to those skilled in the art that various changes may be made in the invention without departing from the spirit and scope thereof and therefore the invention is not limited by that which is shown in the drawings nor by that which is described in the specification but only as indicated in the appended claims wherein:

What is claimed is:

1. A hollow upwardly flaring tubular member closed at the bottom and open at the top, means in the form of an upwardly converging frustum open at its top and bottom providing an opening of definite horizontal area less than the area of the top of the upwardly flaring tubular member mounted on the open top for directing precipitation therethrough and guiding it into the tubular member, and an upstanding element fixed within said tubular member cooperating with the upwardly flaring walls of said tubular member, scale markings graduated on one of said tubular members and upstanding element to indicate the amount of precipitation in said tubular member, whereby small quantities of precipitation may be accurately measured as well as large quantities thereof.

2. The invention according to claim 1 in which the tubular member is transparent.

3. The invention according to claim 1 in which scale markings are on the upstanding element.

4. A precipitation gauge comprising an open top receptacle having an upwardly flaring hollow interior, a base for supporting the receptacle in upstanding position, a hollow cap open at its top and bottom mounted on the open top of the receptacle, said hollow cap being shaped so as to have its periphery converge from the open top of the receptacle to the top of the cap, the top of said cap having a precipitation admission opening of definite area less than the horizontal area of the open top of said receptacle whereby the receptacle will collect precipitation in exact amounts corresponding to the area of the opening in the top of the cap whereby small amounts of precipitation may be accurately measured in the portions of said receptacle of small area adjacent the bottom and large amounts of precipitation may be accurately measured in the upper portions of the receptacle, said receptacle being provided with a scale calibrated with respect to the area of the opening in the top of the cap for directly reading the precipitation.

5. The invention according to claim 4 in which a hollow tubular member is mounted within the receptacle and extends to adjacent the top thereof, a funnel mounted on said hollow tubular member and engaging the inner periphery of the hollow cap whereby precipitation will first pass into the tubular member, said tubular member being provided with an overflow opening to discharge the precipitation into the receptacle after a predetermined amount of precipitation has been collected in the tubular member.

6. The invention according to claim 5 in which a rod is mounted in the tubular member for reducing the volume thereof.

7. The invention according to claim 5 in which a surrounding receptacle receives the open top receptacle having the upwardly flaring hollow interior, said open top receptacle having the upwardly flaring hollow interior being provided with an overflow opening for the discharge of precipitation above a definite amount into said surrounding receptacle.

8. The invention according to claim 5 in which a scale is provided on the tubular member to indicate the amount of precipitation.

9. The invention according to claim 4 in which the base of the receptacle is provided with a centrally disposed aperture for receiving an upstanding rod on which the gauge may be supported.

10. A rain gauge comprising an inverted conical shaped member, a rod fixed therein and projecting upwardly from the lower portion of said inverted conical member toward the flaring mouth, said conical member having openings provided in its wall adjacent the open mouth, a deflector mounted on said rod adjacent the upper portion thereof, said deflector overlying the openings in the wall of said conical member and preventing direct passage of precipitation into said openings, said structure serving to accurately measure the volume of precipitation collected in said conical member.

11. A rain gauge comprising an outer receptacle having upstanding side walls and a bottom, an upwardly flaring hollow member mounted therein, the side walls of said member extending upwardly and terminating adjacent the top of said upstanding side walls of said outer receptacle, the side walls of said member being provided with overflow means near the top for escape of collected precipitation when said member is filled, an elongated element mounted inside of said member, said elongated element extending upwardly and terminating near the top of said member, a deflector fixed at the top of said elongated element preventing precipitation from passing through the overflow means before the hollow member is filled.

References Cited in the file of this patent
UNITED STATES PATENTS

| | | |
|---|---|---|
| 756,109 | Friez | Mar. 29, 1904 |
| 764,315 | Thomas | July 5, 1904 |
| 1,168,027 | Nirdlinger | Jan. 11, 1916 |
| 2,213,888 | Ross | Sept. 3, 1940 |
| 2,244,341 | Maclean | June 3, 1941 |
| 2,497,759 | Cappleman | Feb. 14, 1950 |
| 2,507,206 | Hunn et al. | May 9, 1950 |
| 2,659,362 | Strehl | Nov. 17, 1953 |
| 2,711,099 | Hastings | June 21, 1955 |